March 22, 1949. W. R. SCHLEHR 2,465,283
MELTING AND DRAWING FURNACE
Filed June 17, 1946
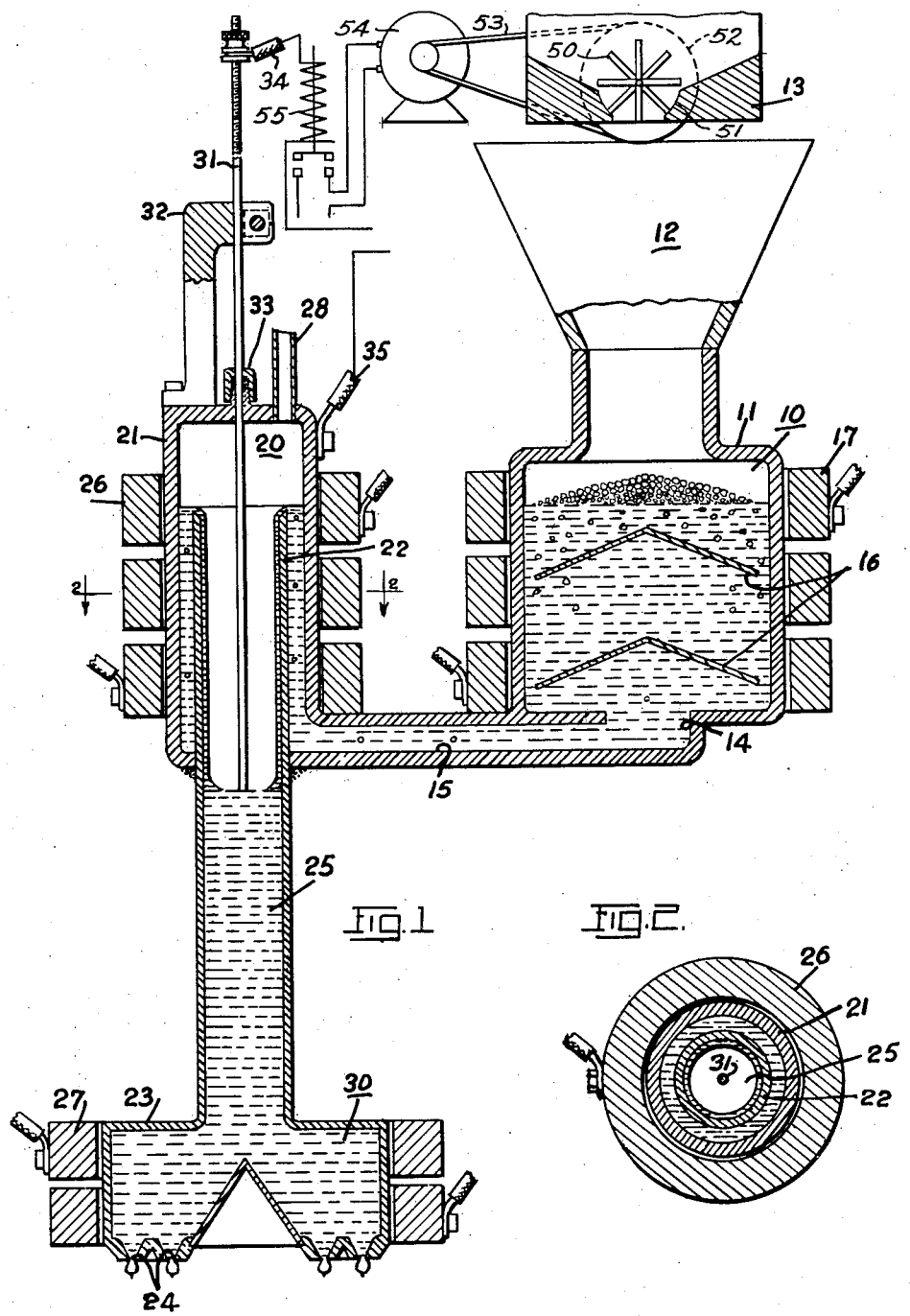
INVENTOR
WALTER R. SCHLEHR,
BY
Toulmin & Toulmin
ATTORNEYS Patented Mar. 22, 1949

2,465,283

UNITED STATES PATENT OFFICE 2,465,283

MELTING AND DRAWING FURNACE

Walter R. Schlehr, Toledo, Ohio, assignor, by mesne assignments, to Glass Fibers, Inc., Waterville, Ohio Application June 17, 1946, Serial No. 677,212

6 Claims. (Cl. 49—55)

This invention relates to the melting, refining and drawing of glass so as to produce fine glass fibers or filaments.

An object of the invention is to melt raw glass batch in a melting chamber or crucible from which it is continuously delivered into a refining chamber for fining the glass and from which the fined glass is delivered into a drawing chamber from which small glass fibers or filaments are drawn.

Another object of the invention is to melt and refine glass in the manner set forth in the foregoing object but wherein the fined glass is delivered into a pressure column which maintains a constant pressure upon the body of glass in the drawing chamber for exuding the glass through small orifices.

Still another object of the invention is to provide for melting, refining and drawing of glass into fine fibers or filaments wherein each of the aforementioned operations is carried forward under individual temperature controlled conditions.

Another object of the invention is to provide an apparatus for preparing glass for drawing of glass fibers or filaments wherein raw glass batch is melted in a melting chamber and the melted glass is delivered by a gravity flow into a refining chamber wherein the glass is fined and is delivered by gravity flow into a drawing chamber from which glass fibers or filaments are drawn.

Another object of the invention is to provide for preparation of glass for drawing of fine fibers or filaments wherein the glass is delivered from the refining chamber into a pressure column for maintaining a predetermined head of glass upon the body of glass in the drawing chamber to thus maintain a predetermined extrusion pressure upon the body of glass in the drawing chamber for extrusion of glass fibers.

Further objects and advantages will become apparent from the drawings and the following description.

In the drawings:

Figure 1 is a cross-sectional view through an apparatus incorporating features of this invention.

Figure 2 is a transverse cross-sectional view of the refining chamber taken along line 2—2 of Figure 1.

The melting, refining and drawing furnace of this invention is constructed in such a manner that the melting, refining and drawing are each occasioned in separate chambers which are adapted to be maintained individually at their own temperature most satisfactory for the particular operation performed therein. The furnace is adapted to receive raw glass batch for melting, and the molten glass is refined in its passage to the drawing chamber to eliminate gas inclusion in the glass. It is well known that when glass is maintained under pressure, or if there is a relatively large head of glass provided in a melting chamber, that it is difficult for gas dissolved in the glass to escape therefrom. Therefore, in this invention there is provided a refining chamber between the melting chamber and the drawing chamber wherein the molten glass is relieved of pressure thereon so that the gas included in the glass can readily escape into the refining chamber. To aid the elimination of included gas, the refining chamber may be maintained at a pressure less than atmosphere.

From the refining chamber, the fined glass is delivered into a pressure column which maintains a predetermined head of glass upon a body of glass in a drawing chamber so as to establish a predetermined pressure upon the glass at the extrusion orifices provided in the drawing chamber for causing a predetermined rate of extrusion of the glass through the orifices.

In this invention, the melting, refining and drawing furnace consists of a melting chamber 10, a refining chamber 20, and a drawing chamber 30. The drawing chamber 30 is connected with the refining chamber 20 by means of a pressure column 25.

The melting chamber 10 consists of a metal crucible 11 that is preferably constructed of a platinum rhodium alloy. The crucible 11 has an inlet opening 12 through which raw glass batch is fed from a feeding unit 13. The bottom wall of the crucible 11 is provided with an opening 14 through which molten glass is delivered into the passage or conduit 15 that connects the melting chamber 10 with the refining chamber 20.

A series of baffle plates 16 are placed one above the other within the crucible 11 to prevent the raw glass batch from settling directly to the bottom of the chamber 10. By the time the particles of glass batch reach the bottom wall of the crucible 11, the materials are completely melted.

A high frequency induction coil 17 is placed around the crucible 11 for inductively heating the crucible and the glass batch therein. The high frequency induction coil is connected to any suitable source of high frequency energy for maintaining the crucible 11 at a desired melting temperature, preferably in the neighborhood of 2800° F.

The refining chamber 20 consists of a crucible 21 that is also constructed preferably of a platinum rhodium alloy. The crucible 21 is connected at its lower end with the conduit or passage 15 to receive molten glass from the melting chamber 10. The molten glass rises within the refining chamber 20 to substantially the same level as the level of the body of molten glass in the melting chamber 10. Thus, the general direction of movement of the molten glass in the refining chamber 20 is upwardly.

A tubular member 22 extends upwardly through the bottom wall of the refining crucible 21 and has the upper edge thereof substantially at the level of the glass that is maintained in the melting chamber 10. Thus, when the level of the glass within the refining chamber 20 rises above the upper edge of the tube 22, the glass will overflow the edge of the tube 22 into the interior thereof.

The lower end of the tube 22 is connected with a crucible 23 that forms the drawing chamber 30, the crucible 23 having a plurality of orifices 24 in the bottom wall thereof through which molten glass is exuded from the drawing chamber 30.

The molten glass entering the tube 22 from the refining chamber 20 flows by gravity into the drawing chamber 30 and fills the tube 22 to a controlled predetermined level to thereby form a pressure column of molten glass 25 within the tube 22 which establishes a pressure head upon the body of glass in the drawing chamber. The pressure head thus formed controls the extrusion pressure for exuding the glass through the orifices 24.

The refining crucible 21 is provided with a high frequency induction coil 26 around the same for inductively heating the crucible 21 and the glass therein. Similarly, a high frequency induction coil 27 is provided around the drawing crucible 23 for inductively heating the crucible and the glass therein. The coils 26 and 27 are under independent control so that the refining crucible 21 can be maintained at a high temperature to render the molten glass into a highly fluid condition to allow rapid escape of entrained or dissolved gas from the glass, while the drawing crucible 23 can be maintained at a relatively lower temperature more satisfactory for the drawing of glass fibers or filaments. As for example, the refining chamber 21 can be maintained at a temperature of approximately 2800° F. for rendering the glass highly fluid therein while the temperature of the glass in the drawing chamber can be maintained at approximately 2250° F., which temperature is peculiarly favorable to obtaining glass fibers or filaments having a high tensile strength.

It has previously been referred to here in that to allow the gas to escape from the glass, it is preferable to remove all pressure from the glass to allow the gas to expand and thus escape from the glass when it is in a highly liquefied state. The refining chamber 20 is thus provided with an outlet conduit or passage 28 which may be connected to atmosphere to thereby establish atmospheric pressure within the chamber 20 and allow escape of the dissolved gas as the glass passes over the upper edge of the tube 22, or if desired, the conduit 28 may be connected to a vacuum source for reducing the pressure within the chamber 20 to any desired degree below atmosphere to obtain the desired satisfactory escape of gas from the glass.

To control the height of the pressure column 25, and thus regulate the pressure of the head of glass upon that glass within the drawing chamber 30, a control rod 31 is slidably carried upon a bracket 32 secured to the refining crucible 21. The rod 31 passes downwardly through a suitable closure gland 33 into the tube 22. The rod 31 is provided with an electrical conductor 34 which connects with one side of the power device which operates the feeding unit 13. The opposite side of the electric power device for the feeding unit 13 is connected with the electrical conductor 35 secured to the crucible 21. The bracket 32 and the closure gland 33 suitably electrically insulate the rod 31 from the crucible 21.

The feeding unit 13 may consist of a paddle-wheel arrangement 50 that operates in an opening 51 in the feeding unit 13. The paddle-wheel 50 is driven by a pulley 52 that is connected by a belt 53 with the power device 54. The power device 54 is connected with the electrical conductors 34 and 35 through a controller 55 which opens the electric circuit to the power device when the controller 55 is energized upon completion of electric circuit through the controller when the column of molten glass 25 engages the end of the control rod 31, whereby to stop the power device 54. When the column of molten glass 25 falls away from the end of the rod 31 the controller 55 will close circuit to the power device 54 and thereby rotate the paddle-wheel 50 to feed glass material into the heating chamber 10.

When the level of the pressure column 25 engages the lower end of the rod 31 an electrical circuit will be completed between the conductors 34 and 35 through the operating mechanism for the feeding unit 13 to thereby stop operation of the feeding unit. However, as soon as the level of the pressure column falls to disengage the end of the rod 31, the feeding unit 13 will again be operated to feed raw glass batch into the melting chamber 10. Feeding of raw glass batch into the melting chamber 10 causes the level of the molten glass therein to rise, and causes a corresponding rise in the level of the molten glass in the refining chamber 20 to a point that the glass will overflow the edge of the tube 22 and be delivered into the pressure column 25. Thus, the height of the pressure column 25 is accurately controlled to maintain a predetermined pressure upon the molten glass at the orifices 24 in the drawing crucible 23 for exuding the glass at a predetermined rate.

The height of the pressure column 25 can be regulated by raising or lowering the control rod 31.

While the apparatus disclosed and described herein, and the method performed thereby, illustrates a preferable form of the invention, yet it will be understood that the apparatus is capable of alteration without departing from the spirit of the invention, and that all modifications of the invention that fall within the terms of the appended claims are intended to be included herein.

Having thus fully described my invention, what I claim as new and desire to secure by Letters Patent is:

1. An apparatus for melting and preparing glass or other materials for drawing fine fibers or filaments which comprises, a melting chamber having means for heating the same surrounding it, a refining chamber having independent means for heating the same surrounding it, means for conducting molten material from the lower portion of the melting chamber into the lower portion of the refining chamber, and means forming an internal chamber within said refining chamber and extending from the lower portion thereof forming an edge over which molten material flows from the refining chamber into the said internal chamber to form a column of molten material therein, said means forming the internal chamber terminating in a drawing chamber having a plurality of orifices therein through which molten material is exuded.

2. An apparatus for melting and preparing glass or other materials for drawing fine fibers or filaments which comprises, a melting chamber having means for heating the same surrounding it, a refining chamber having independent means for heating the same surrounding it, means for conducting molten material from the lower portion of the melting chamber into the lower portion of the refining chamber, means forming an internal chamber within said refining chamber and extending from the lower portion thereof and forming an edge over which molten material flows from the refining chamber into the said internal chamber to form a column of molten material therein, said means forming the internal chamber terminating in a drawing chamber having a plurality of orifices therein through which molten material is exuded, and means for heating said drawing chamber independently of the melting and refining chambers and surrounding it.

3. An apparatus for melting and preparing glass or other materials for drawing of fine fibers or filaments which comprises, means forming a melting chamber having an opening therein through which batch materials are fed and having heating means surrounding the chamber for heating the same, a separate refining chamber having independent heating means surrounding it for maintaining the molten material therein in a high state of fluidity, said refining chamber being connected with the atmosphere, means connecting the lower portion of said melting chamber with the lower portion of said refining chamber for conducting molten material from the melting to the refining chamber, chamber forming means positioned internally of said refining chamber and having an upper edge over which molten material flows for fining of the molten material upon entry into the chamber, said chamber forming means including means connecting the same with a drawing chamber having a plurality of orifices therein and forming therewith a column to receive molten material overflowing the said edge to establish pressure upon the molten material in the drawing chamber by the weight of the material in the column.

4. An apparatus for melting and preparing glass or other materials for drawing of fine fibers or filaments which comprises, means forming a melting chamber having an opening therein through which batch materials are fed and having heating means surrounding the chamber for heating the same, a separate refining chamber having independent heating means surrounding it for maintaining the molten material therein in a high state of fluidity, said refining chamber being connected with the atmosphere, means connecting the lower portion of said melting chamber with the lower portion of said refining chamber for conducting molten material from the melting to the refining chamber, chamber forming means positioned internally of said refining chamber and having an upper edge over which molten material flows for fining of the molten material upon entry into the chamber, said chamber forming means including means connecting the same with a drawing chamber having a plurality of orifices therein and for dissipating heat from material passing therethrough and forming a column to receive molten material overflowing the said edge to establish pressure upon the molten material in the drawing chamber by the weight of the material in the column, and means disposed within said internal chamber for engagement by the said column of molten material to effect a control of the delivery of batch material into the melting chamber in response to the height of the said column.

5. An apparatus for melting and preparing glass or other materials for drawing of fine fibers or filaments which comprises, means forming a melting chamber having an opening therein through which batch materials are fed and having heating means surrounding the chamber for heating the same, a separate refining chamber having independent heating means surrounding it for maintaining the molten material therein in a high state of fluidity, said refining chamber being connected with the atmosphere, means connecting the lower portion of said melting chamber with the lower portion of said refining chamber for conducting molten material from the melting to the refining chamber, chamber forming means positioned internally of said refining chamber and having an upper edge over which molten material flows for fining of the molten material upon entry into the chamber, said chamber forming means including means connecting the same with a drawing chamber having a plurality of orifices therein and for dissipating heat from material passing therethrough and forming a column to receive molten material overflowing the said edge to establish pressure upon the molten material in the drawing chamber by the weight of the material in the column.

6. An apparatus for melting and preparing glass or other materials for drawing of fine fibers or filaments which comprises, a cylindrical chamber forming a melting chamber, heating means arranged annularly around said chamber, a separate cylindrical chamber forming a refining chamber, a heating means arranged annularly around said refining chamber independent of said first heating means, means connecting the lower portion of said melting chamber with the lower portion of said refining chamber, a tubular member disposed centrally within said refining chamber over the upper end of which molten material can flow to within said tubular member and projecting from the lower portion of said refining chamber, a drawing chamber secured to the lower end of said tubular member and having a heating means surrounding the same independent of any of the other heating means, said drawing chamber having a plurality of orifices therein through which molten material can be exuded.

WALTER R. SCHLEHR.

REFERENCES CITED

The following references are of record in the file of this patent:

UNITED STATES PATENTS

| Number | Name | Date |
|---|---|---|
| 1,889,510 | Amsler | Nov. 29, 1932 |
| 1,953,023 | Mulholland | Mar. 27, 1934 |
| 2,159,361 | Atkinson et al. | Nov. 30, 1936 |